3,000,940
PERCHLORYLARYLUREAS
Maynard S. Raasch, Wilmington, Del., assignor to E. I. du Pont de Nemours and Company, Wilmington, Del., a corporation of Delaware
No Drawing. Filed Feb. 17, 1959, Ser. No. 793,662
6 Claims. (Cl. 260—553)

This invention relates to perchlorylaryl ureas, to their preparation, and to their employment to produce albinism in chlorophyll-containing organisms.

In recent years considerable attention has been given to the control of algae in industrial water supplies, in ponds, in swimming pools and in many other instances where considerable quantities of water are subject to algae contamination. There is continuing need for chemical agents which will control such contamination at low rates of application.

It has now been found that perchlorylaryl ureas are especially suitable for this purpose. At very low levels of application these compounds cause bleaching of the algae and inhibition of further growth. The compounds of this invention are especially valuable for controlling algae in swimming pools and in many air-conditioning installations where highly objectionable brown scum is formed with conventional treatments that do not kill by bleaching the chlorophyll components. These perchlorylaryl ureas also cause marked albinism in higher plants, and, when sufficient amounts are applied to completely bleach all of the chlorophyll components, it is noted that the plant is slowly killed.

The new perchlorylaryl ureas of this invention have the formula $$A-N(R_3)-C(X)=N-R_1(R_2)$$

wherein A represents an aromatic radical joined by nuclear carbons to a perchloryl group and urea nitrogen and optionally having nuclear hydrocarbon, halogen, including fluorine, chlorine and bromine, and alkoxy substituents with A in general containing 6–10 carbons; $R_3$ is hydrogen or lower alkyl; $R_1$ and $R_2$ can be the same or different and represent hydrogen or alkyl of up to 4 carbons; and X is oxygen or sulfur (i.e., a chalcogen of atomic number of 8–16).

Preferred perchlorylaryl ureas of my invention have the formula $$O_3Cl-C_6H_2(Y)(Z)-N(H)-C(O)-N(R_1)(R_2)$$

wherein Y is hydrogen, fluorine, chlorine, bromine or alkyl of one to four carbons, Z is hydrogen or chlorine, $R_1$ is hydrogen or methyl, and $R_2$ is alkyl of one to four carbons.

Illustrative of the novel compounds of this invention are:

1,1-dimethyl-3-(m-perchlorylphenyl)urea
1-methyl-3-(m-perchlorylphenyl)urea
1-n-butyl-1-methyl-3-(m-perchlorylphenyl)urea
1-ethyl-1-methyl-3-(m-perchlorylphenyl)urea
1,1-dimethyl-3-(o-perchlorylphenyl)urea
1,1-dimethyl-3-(p-perchlorylphenyl)urea
1-methyl-3-(p-perchlorylphenyl)urea
1-n-butyl-1-methyl-3-(p-perchlorylphenyl)urea
1,1-dimethyl-3-(2-chloro-5-perchlorylphenyl)urea
1,1-dimethyl-3-(2-fluoro-5-perchlorylphenyl)urea
1,1-dimethyl-3-(4-chloro-3-perchlorylphenyl)urea
1,1-dimethyl-3-(3-chloro-4-perchlorylphenyl)urea
1,1-dimethyl-3-(2-bromo-5-perchlorylphenyl)urea
1,1-dimethyl-3-(2,3-dichloro-5-perchlorylphenyl)urea
1,1-dimethyl-3-(3,5-dichloro-4-perchlorylphenyl)urea
1,1-dimethyl-3-(2,5-dichloro-3-perchlorylphenyl)urea
1,1-dimethyl-3-(3-methyl-4-perchlorylphenyl)urea
1,1-dimethyl-3-(3-bromo-4-perchlorylphenyl)urea
1-n-butyl-1-methyl-3-(4-methyl-3-perchlorylphenyl)urea
1,1-dimethyl-3-(2-ethyl-5-perchlorylphenyl)urea
1,1-dimethyl-3-(2-methoxy-5-perchlorylphenyl)urea
1,1,3-trimethyl-3-(p-perchlorylphenyl)urea
1,1-dimethyl-3-(3-perchlorylnaphthyl)urea
1,1-dimethyl-3-(m-perchlorylphenyl)thiourea The new perchlorylaryl ureas including the thioureas that are provided by this invention are preferably obtained by reaction of a lower dialkyl carbamyl halide with a perchloryl substituted arylamine having hydrogen on amino nitrogen, i.e., as shown by the following equation wherein the halogen is illustrated by chlorine:

$$O_3Cl\text{-}C_6H(R_4)_n\text{-}NH(R_3) + R_1R_2N\text{-}C(X)\text{-}Cl \longrightarrow$$
$$O_3Cl\text{-}C_6H(R_4)_n\text{-}N(R_3)\text{-}C(X)\text{-}N(R_1)(R_2) + HCl$$

wherein $R_1$ and $R_2$ are lower alkyl, $R_3$ and X are as previously indicated, and $(R_4)_n$ represents one or more members, the same or different, of the class consisting of hydrogen, alkyl, preferably one to four carbons, alkoxy and halogen, $n$ being preferably no more than 2. The reaction takes place in the presence of an acid acceptor, e.g., a tertiary amine which is suitably employed as a solvent at temperatures of preferably 30–100° C. The resulting perchlorylaryl urea is readily separated and purified by conventional techniques.

A further process by which new perchlorylaryl ureas can be obtained consists in forming isocyanates from a perchlorylaniline and phosgene followed by reaction with a hydrogen-bearing amine, e.g., as shown by the equation $$O_3Cl\text{-}C_6H(R_4)\text{-}NH_2 + COCl_2 \longrightarrow$$
$$O_3Cl\text{-}C_6H(R_4)\text{-}NCO \xrightarrow{R_1R_2NH} O_3Cl\text{-}C_6H(R_4)\text{-}N(H)\text{-}C(O)\text{-}N(R_1)(R_2)$$

Thus, perchlorylaryl ureas of this invention are obtained by reaction of phosgene with perchlorylanilines such as employed in Examples I–IV. The reaction is carried out generally in an inert solvent, e.g., dioxane, at 50–100° C. The perchlorylaryl isocyanate solution thus formed is preferably subjected to reduced pressure to remove hydrogen chloride and excess phosgene. The perchlorylaryl isocyanates thus formed react with hydrogen bearing amines, i.e., primary or secondary amines of the formula $R_1R_2NH$ where $R_1$ and $R_2$ are as previously defined. The amines included for reaction with the isocyanate are methylamine, dimethylamine, methylpropylamine, and dibutylamine.

The perchlorylaryl amines useful in this invention include those having preferably up to 10 carbons with up to two additional substituents on the benzenoid ring. Included specifically are perchlorylnaphthylamine, dichloroperchlorylaniline, and bromoperchlorylaniline.

These new compounds are solids which generally melt above 100° C. and are soluble in hydrocarbon and halogenated hydrocarbon solvents, as well as the lower alkanones and alkanols.

The perchlorylaryl ureas of this invention are plant regulants, particularly in that they produce albinism. These compounds can be applied in a number of ways. Generally they are formulated by mixture with a conventional carrier material or conditioning agent. This provides a formulation adapted for ready and efficient application to water supplies, soils, or plants using conventional applicator equipment. Adjuvants, such as dusts, solvents, wetting, dispersing and emulsifying agents, can be employed in preparing the compositions containing the compounds of the present invention. Preferred compositions are in the form of water-dispersible powders which can be prepared by admixing one or more of the active compounds with, e.g., a surface-active agent and a finely divided solid carrier, such as talc, natural clay, diatomaceous earth and other powdered diluents. The surface-active agents are used in amounts sufficient to impart water dispersibility to the powder. Liquid compositions can also be prepared by dissolving one or more of the active compounds in conventional organic liquid carriers.

For control of algae in water, one or more perchlorylaryl ureas are added to the water either in solution in a water-soluble organic solvent or as a finely dispersed wettable powder. If the water already contains algae contamination, a greater amount of urea will be required than is necessary for prevention of such growth. In general, 1–100 parts of perchlorylaryl urea are used per million parts of water for control of algae.

These compounds are also suitable for control of the growth of algae often noted on the soil around ornamental plants in flower beds and around potted plants. In such applications, an aqueous composition containing about 1 part per million of perchlorylaryl urea is sprayed on the surface of the soil, causing bleaching of the algae and inhibiting their growth.

The perchlorylaryl ureas of this invention can also be used in agriculture. These compounds can be sprayed on the soil for pre-emergence weed control. Formation of chlorophyll is prevented causing the emerging weeds to exhibit either a bleached appearance or sometimes a reddish coloration after about five days and eventually to die. In such applications a visual check is thus provided which indicates the coverage and effectiveness of the treatment. This characteristic inhibition of chlorophyll formation is noted in both broadleaved and grass annual and perennial plants such as crab grass, foxtail, Johnson grass, ragweed, and chickweed, and the growth of such weeds is readily controlled by application of these perchlorylaryl ureas. In general, when applied as a foliar spray, a dosage of about 0.5 to 10 pounds per acre of the active ingredient is used. When sprayed on the soil for pre-emergence control of weeds, 0.75 to 3 pounds per acre are used. The new perchlorylaryl ureas are particularly useful to control weeds selectively in plantings of leguminous crops, such as peas and peanuts.

The following examples further illustrate the preparation of compounds of this invention and their use.

Example I

To 11 g. of m-perchlorylaniline (prepared according to the process of Inman, Oesterling and Tyczkowski, J. Am. Chem. Soc., 80, 5286 (1958)) in 20 ml. of pyridine is added 6.8 g. of dimethylcarbamyl chloride. The solution is heated at 100° C for one hour and then cooled and poured into 200 ml. of water. To this is added 25 ml. of hydrochloric acid. The solid is filtered off, dried, and recrystallized from ethyl acetate to give 7 g. (46% yield) of 1,1-dimethyl-3-(m-perchlorylphenyl)urea, M.P. 166–169° C.

Analysis.—Calcd. for $C_9H_{11}ClN_2O_4$: C, 43.82; H, 4.50; Cl, 14.38. Found: C, 44.00; H, 4.48; Cl, 14.72.

Example II

Perchloryl flouride is passed into a mixture of 66 g. of anhydrous aluminum chloride and 300 ml. of toluene at 10–20° C. until no more hydrogen chloride is evolved. The organic solution is filtered, steam distilled and the toluene is removed from the organic layer under reduced pressure. The perchlorylated toluenes remaining are cooled and the p-isomer crystallizes out. The p-perchloryltoluene is recrystallized from hexane and melts at 60–61° C.

Analysis.—Calcd. for $C_7H_7ClO_3$: Cl, 20.31. Found: Cl, 20.13.

p-Perchloryltoluene when nitrated with mixed nitric and sulfuric acids gives 2-nitro-4-perchloryltoluene which is reduced with stannous chloride in hydrochloric acid to give 2-amino-4-perchloryltoluene (alternately named 2-methyl-5-perchlorylaniline). This amine is converted to 1,1-dimethyl-3-(2-methyl-5-perchlorylphenyl)urea by the procedure described in Example I.

Example III

Using chlorobenzene instead of toluene in Example II, p-chloroperchlorylbenzene, M.P. 57.5–58.5° C., is obtained.

Analysis.—Calcd for $C_6H_4Cl_2O_3$: Cl, 36.37. Found: Cl, 36.19.

By the procedure of Example II, this compound is converted into 2-chloro-5-perchlorylaniline which reacts with dimethylcarbamyl chloride to form 1,1-dimethyl-3-(2-chloro-5-perchlorylphenyl)urea.

Example IV p-Fluoroperchlorylbenzene (Inman et al., loc. cit.) is converted by the procedure of Example II to 2-fluoro-5-perchlorylaniline which reacts with dimethylcarbamyl chloride to yield 1,1-dimethyl-3-(2-fluoro-5-perchlorylphenyl)urea.

Example V

A solution is prepared with the following composition:

| | Percent |
|---|---|
| 1,1-dimethyl-3-(m-perchlorylphenyl)urea | 10 |
| Dimethylformamide | 90 |

Enough of this solution is added to the water supply in a home air-conditioning system to produce a concentration of five parts per million of active ingredient. At this concentration the algae already present in the system become bleached and further growth is prevented.

Example VI

A wettable powder is prepared by blending the components in a ribbon blender followed by micropulverizing in a hammer mill until the product is substantially all below 50 microns and then reblending until homogeneous.

| | Percent |
|---|---|
| 1,1-dimethyl-3-(m-perchlorylphenyl)urea | 25 |
| Kaolin clay | 73 |
| Dioctyl ester of sodium sulfosuccinic acid | 1 |
| Sodium lignin sulfonate | 1 |

This composition is dispersed in water and applied to the soil at the rate of 1 lb. of active ingredient in 80 gallons of water per acre as a pre-emergence treatment for peanuts. It is noted that the emerging weeds show albinism after 4–5 days and eventually die. Effective control of crabgrass, wild mustard, foxtail, barnyard grass, pigweed and lamb's quarters is obtained by this treatment. The action is very selective, since higher rates do not harm the peanuts.

Although the perchlorylaryl compounds obtained by the process of Inman et al., J. Am. Chem. Soc., 80, 5386 (1958), and used herein as intermediates, are shock-sensitive and thermally unstable, they can be safely used when in a moist condition for the synthesis of the ureas of this invention.

The embodiments of the invention in which an exclusive property or privilege is claimed are defined as follows:
1. 1,1-dimethyl-3-(m-perchlorylphenyl)urea.
2. 1,1-dimethyl-3-(2-methyl-5-perchlorylphenyl)urea.
3. 1,1-dimethyl-3-(2-chloro-5-perchlorylphenyl)urea.
4. 1,1-dimethyl-3-(2-fluoro-5-perchlorylphenyl)urea.

5. Compounds of the formula

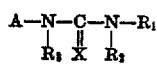

wherein A is an aryl group of 6 to 10 carbons in which one of its nuclear carbon atoms is attached to the perchloryl group and the remaining nuclear carbons are attached to members of the group consisting of hydrogen, alkyl of 1 to 4 carbon atoms, alkoxy of 1 to 4 carbon atoms and halogen, $R_1$ and $R_2$ are members of the class consisting of hydrogen and alkyl of from 1 to 4 carbon atoms, $R_3$ is a member of the class consisting of hydrogen and lower alkyl and X is a chalcogen of atomic number of 8–16.

6. Process which comprises reacting at a temperature of 30 to 100° C. and in the presence of an acid acceptor a compound of the formula

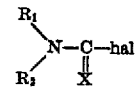

wherein $R_1$ and $R_2$ are members of the class consisting of hydrogen and alkyl of 1 to 4 carbon atoms, hal is halogen and X is a chalcogen of atomic number 8–16, with an arylamine of 6 to 10 carbon atoms having hydrogen on amino nitrogen and in which one of the nuclear carbon atoms of the aryl group is attached to the perchloryl group and the remaining nuclear carbons are attached to members of the group consisting of hydrogen, halogen, alkyl of 1 to 4 carbon atoms and alkoxy of 1 to 4 carbon atoms.

No references cited.